(12) United States Patent
Lee et al.

(10) Patent No.: US 10,150,315 B2
(45) Date of Patent: Dec. 11, 2018

(54) THREE-DIMENSIONAL PRINTER HAVING MANUAL FLAT SCANNER

(71) Applicants: XYZPRINTING, INC., New Taipei (TW); KINPO ELECTRONICS, INC., New Taipei (TW)

(72) Inventors: Yang-Teh Lee, New Taipei (TW); Jia-Yi Juang, New Taipei (TW); Chun-Hsiang Huang, New Taipei (TW); Ming-En Ho, New Taipei (TW); Yi-Chu Hsieh, New Taipei (TW); Ting-Chun Chu, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 0 days.

(21) Appl. No.: 15/635,002

(22) Filed: Jun. 27, 2017

(65) Prior Publication Data
US 2018/0304658 A1    Oct. 25, 2018

(30) Foreign Application Priority Data

Apr. 20, 2017  (TW) .............................. 106113240 A

(51) Int. Cl.
*B41J 29/38*  (2006.01)
*B41J 3/407*  (2006.01)

(52) U.S. Cl.
CPC ............. *B41J 29/38* (2013.01); *B41J 3/4073* (2013.01)

(58) Field of Classification Search
CPC .................................. B41J 29/38; B41J 3/4073
See application file for complete search history.

(56) References Cited

U.S. PATENT DOCUMENTS

| 2013/0278965 | A1* | 10/2013 | Uno ................... H04N 1/00095 |
| | | | 358/1.15 |
| 2016/0096322 | A1 | 4/2016 | Cheng et al. |
| 2016/0151980 | A1 | 6/2016 | Hatanaka |

FOREIGN PATENT DOCUMENTS

| EP | 2985134 A1 | 2/2016 | |
| EP | 2 985 134 | * 7/2016 | ............. B29C 67/00 |
| EP | 3056332 A1 | 8/2016 | |
| JP | 2006270640 | 10/2006 | |

OTHER PUBLICATIONS

Search Report dated Jan. 25, 2018 of the corresponding European patent application No. 17178127.1.

* cited by examiner

*Primary Examiner* — Henok Legesse
(74) *Attorney, Agent, or Firm* — Chun-Ming Shih; HDLS IPR SERVICES

(57) ABSTRACT

A 3D printer including a device body (100) and a scanning module (200) is provided. A printing plane (101) is defined on the device body (100). The scanning module (200) is arranged on the device body (100), the scanning module (200) is electrically connected with a control module (300), and the control module (300) is electrically connected with a nozzle assembly (310) and a pen assembly (320). A 3D data is loaded in the control module (300) and a predetermined painting position is defined in the 3D data. The control module (300) receives a scan image from the scanning module (200); the control module (300) controls the nozzle assembly (310) to print a model (20) according to the 3D data and meanwhile controls the pen assembly (320) to paint on the model (20) according to the predetermined painting position and the scan image.

9 Claims, 8 Drawing Sheets

THREE-DIMENSIONAL PRINTER HAVING MANUAL FLAT SCANNER

BACKGROUND OF THE INVENTION

Field of the Invention

The present invention relates to a 3D (three-dimension) printer and in particular to a 3D printer equipped with a manual flat scanner.

Description of Prior Art

The current 3D printer can print a colorful 3D model in which the method of FDM (Fused Deposition Modeling) is generally used to extrude melted plastics as layers by the nozzle and stacks the layers to form the model according to a 3D data. After the model is completed, the coloring nozzles are used to paint on the surface of the 3D model according to another surface color file. The above-mentioned method is more suitable for printing color blocks, but not suitable for the color combination composing a picture of a photograph.

When an existing picture is required to be printed on the flat surface of the 3D model, the 3D model and the picture are generally placed into the flat scanner directly and painted using the coloring nozzles, which has a disadvantage that various ink tanks disposed in the coloring nozzle causes a considerable volume. Also, it is difficult to move the coloring nozzle into the recess of the 3D model for printing.

In view of this, the inventor pays special attention to research with the application of related theory and tries to improve and overcome the above disadvantages regarding the above related art, which becomes the improvement target of the inventor.

SUMMARY OF THE INVENTION

The present invention provides a 3D printer equipped with a manual flat scanner.

The present invention provides a 3D printer comprising a device body and a scanning module. A printing plane is defined on the device body. The scanning module is arranged on the device body. The scanning module is electrically connected with a control module which is electrically connected with a nozzle assembly and a pen assembly. A 3D data is loaded in the control module and a predetermined painting position is defined in the 3D data. The control module receives a scan image from the scanning module and controls the nozzle assembly to print a model according to the 3D data and meanwhile the control module controls the pen assembly to paint on the model according to the predetermined painting position and the scan image during the printing of the model.

In the 3D printer of the present invention, the scanning module comprises a module body, a closure mechanism, and a flat scanner. The module body has a feeding channel disposed corresponding to a side edge of the printing plane. The closure mechanism closes the feeding channel selectively. The flat scanner is disposed in the feeding channel correspondingly.

In the 3D printer of the present invention, the module body comprises a base and a movable cover stacked above the base. The closure mechanism is connected between the base and the movable cover. The closure mechanism is a rebound device. The flat scanner can be disposed on the base or on the movable cover.

In the 3D printer of the present invention, the closure mechanism has a movable plate pivoted to the module body. The closure mechanism has a flexible restorer which is pressed against the module body and the movable plate to push the module body to close the feeding channel.

In the 3D printer of the present invention, the bottom of the feeding channel can be flush with the printing plane or higher than the printing plane. The feeding channel extends horizontally in parallel with the printing plane.

In the 3D printer of the present invention, the flat scanner scans a pictorial paper passing through the feeding channel to obtain the scan image. The control module controls the pen assembly to paint the surface of the model according to the scan image.

By means of the flat scanner disposed on the printing plane, the flat images can be scanned and printed on the surface of the model.

DETAILED DESCRIPTION OF THE INVENTION

Figure 1:
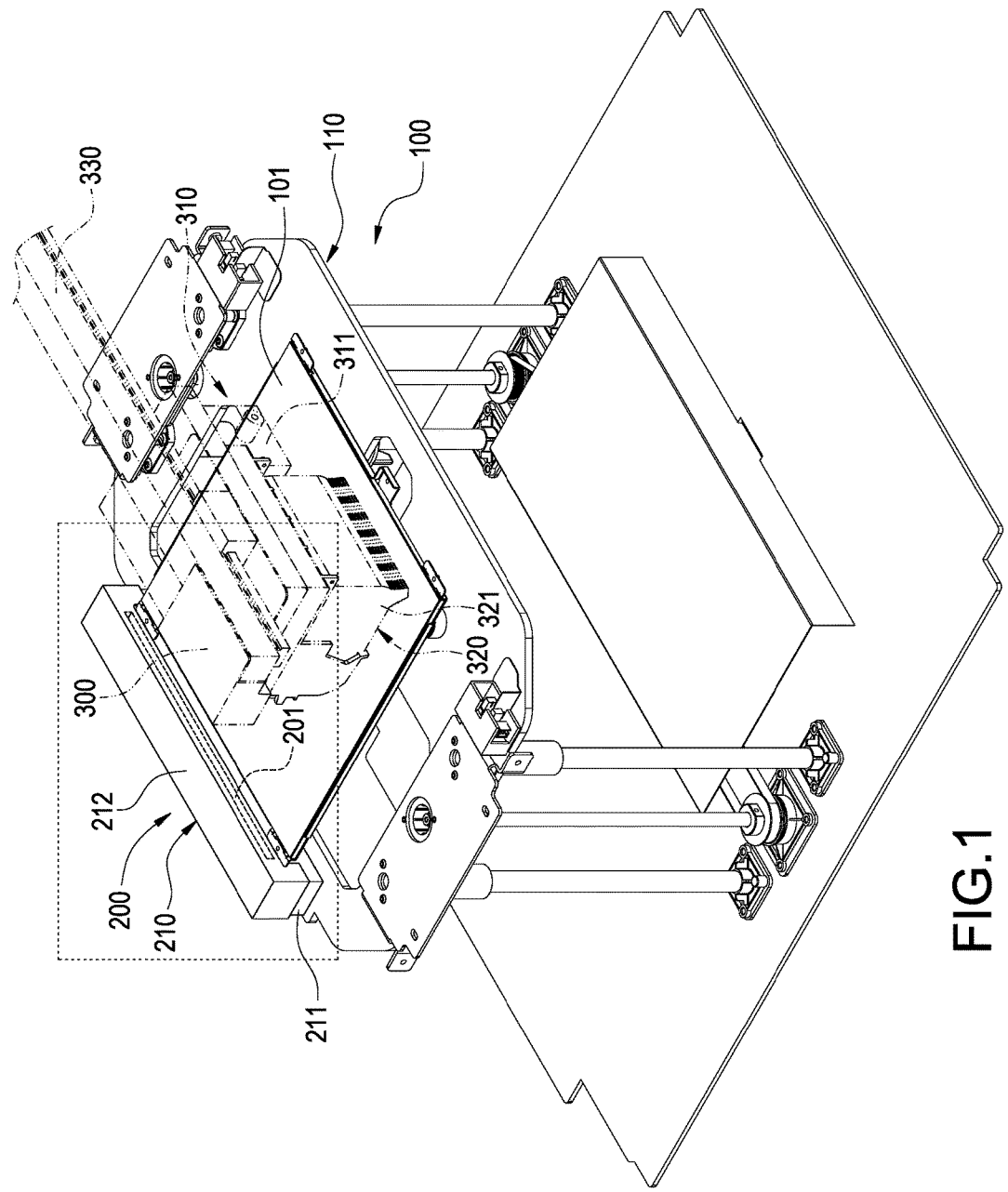
FIGS. 1 and 2 show the perspective views of the 3D printer according to the first embodiment of the present invention.
Figure 2:
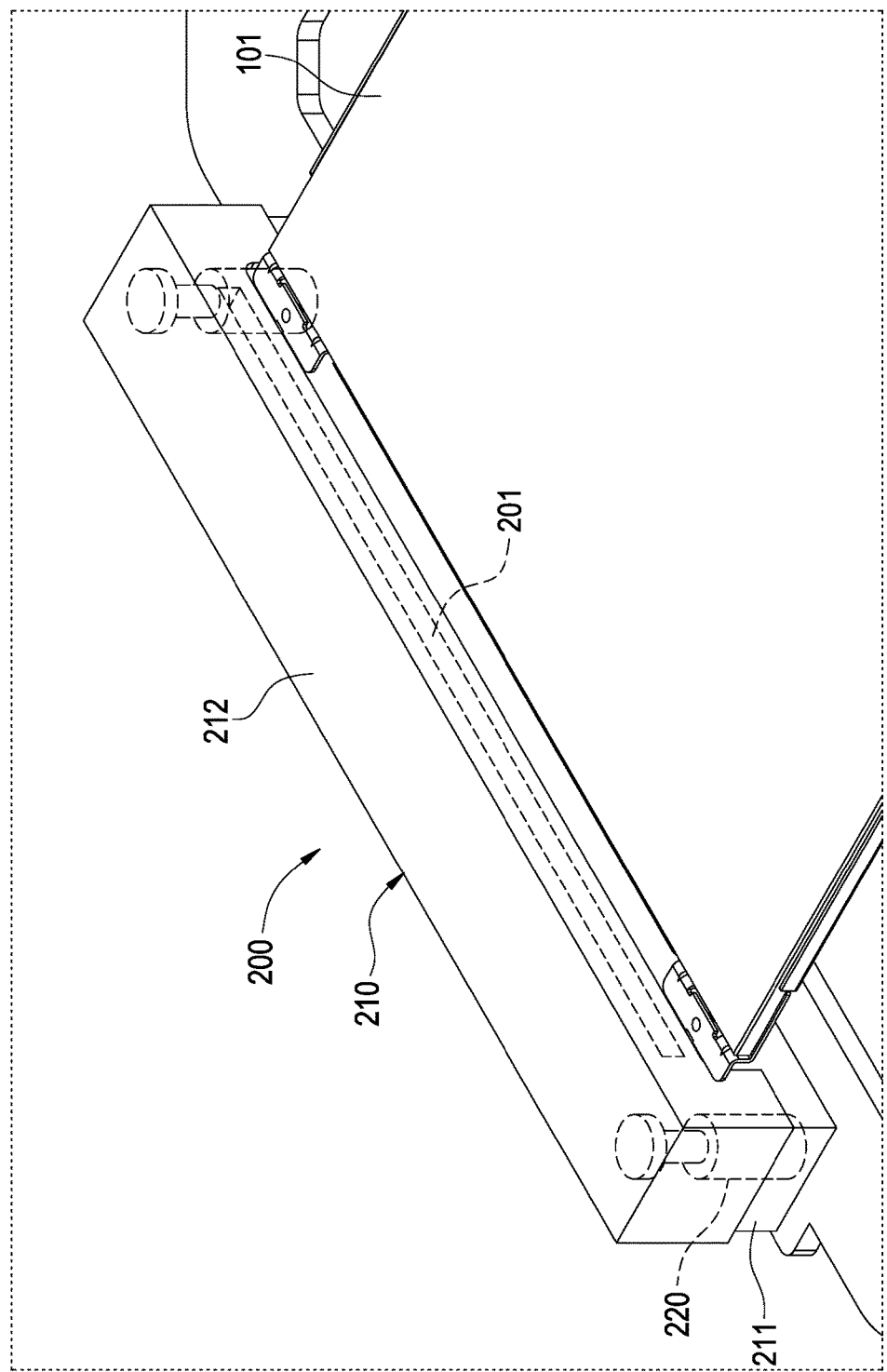

Please refer to FIGS. 1 and 2. The first embodiment of the present invention provides a 3D printer which comprises a device body 100 and a scanning module 200.

The form of the device body 100 of the present invention is not limited, but a printing plane 101 has to be formed on the device body 100 to allow a 3D model (not shown) to be printed on the printing plane 101. In the current embodiment, the device body 100 preferably has a lifting platform 110. The printing plane 101 is formed on the top of the lifting platform 110 and can move vertically. The scanning module 200 is arranged on the lifting platform 110 and is disposed corresponding to the printing plane 101, the configuration detailed below. The scanning module 200 comprises a module body 210, a closure mechanism 220, and a flat scanner 230.

In the current embodiment, the module body 210 of the scanning module 200 comprises a base 211 fixed on the lifting platform 110 and a movable cover 212 stacked detachably above the base 211. The gap between the base 211 and the movable cover 212 forms a feeding channel 201 penetrating through the module body 210. The feeding channel 201 extends horizontally in parallel with the printing plane 101. The feeding channel 201 is disposed corresponding to a side edge of the printing plane 101; one end opening of the feeding channel 201 is immediately adjacent to the side edge of the printing plane 101. Besides, the bottom of the feeding channel 201 is flush with the printing plane 101 or higher than the printing plane 101. The closure mechanism 220 is connected between the base 211 and the movable cover 212; the closure mechanism 220 is used to close the feeding channel 201 selectively. In the current embodiment, the closure mechanism 220 is a rebound device and can shrink and stretch. The closure mechanism 220 in the compressed state will stretch if pressed; the closure mechanism 220 in the stretched state will shrink if pressed. Two ends of the closure mechanism 220 are individually connected with the base 211 and the movable cover 212. Pressing the lowered movable cover 212 can cause the closure mechanism 220 to stretch such that the movable cover 212 is lifted and separated from the base 211 to open the feeding channel 201. Pressing the lifted movable cover 212 can cause the closure mechanism 220 to shrink such that the movable cover 212 moves close to the base 211 to close the feeding channel 201. The flat scanner 230 is disposed in the feeding channel 201 correspondingly. In the current embodiment, the flat scanner 230 is disposed on the base 211 and faces the interior of the feeding channel 201 to scan the image inside the feeding channel 201, but the present invention is not limited to this. For example, the flat scanner 230 also can be disposed on the movable cover 212 and disposed facing the interior of the feeding channel 201 to scan the image inside the feeding channel 201. The flat scanner 230 is electrically connected with a control module 300 (e.g., Micro Control Unit/MCU). Also, the control module 300 is electrically connected with the nozzle assembly 310 and the pen assembly 320.

The structures of the nozzle assembly 310 and the pen assembly 320 are based on the existing techniques, which will be explained briefly only, not in detail, in the current embodiment. The nozzle assembly 310 may comprise the extrusion nozzle 311 and the track 330 on which the extrusion nozzle 311 moves. The pen assembly 320 may comprise the coloring nozzle 321 and the track 330 on which the coloring nozzle 321 moves. In general, the extrusion nozzle 311 and the coloring nozzle 321 are connected with each other, disposed on the same track 330, and move at the same time. The extrusion nozzle 311 is used to extrude melted plastics as layers on the printing plane 101 and stack the layers to form the model 20. The coloring nozzle 321 is used to paint on the surface of the model 20. The control module 300 controls the extrusion nozzle 311 and the coloring nozzle 321 to move on the track 300 to the predetermined printing position or the predetermined painting position.

When the flat scanner 230 is not used, the feeding channel 201 can be closed to prevent the dust generated during the operation of the extrusion nozzle 311 from adhering to the flat scanner 230 and from reducing the scan quality of the flat scanner 230.

Figure 3:
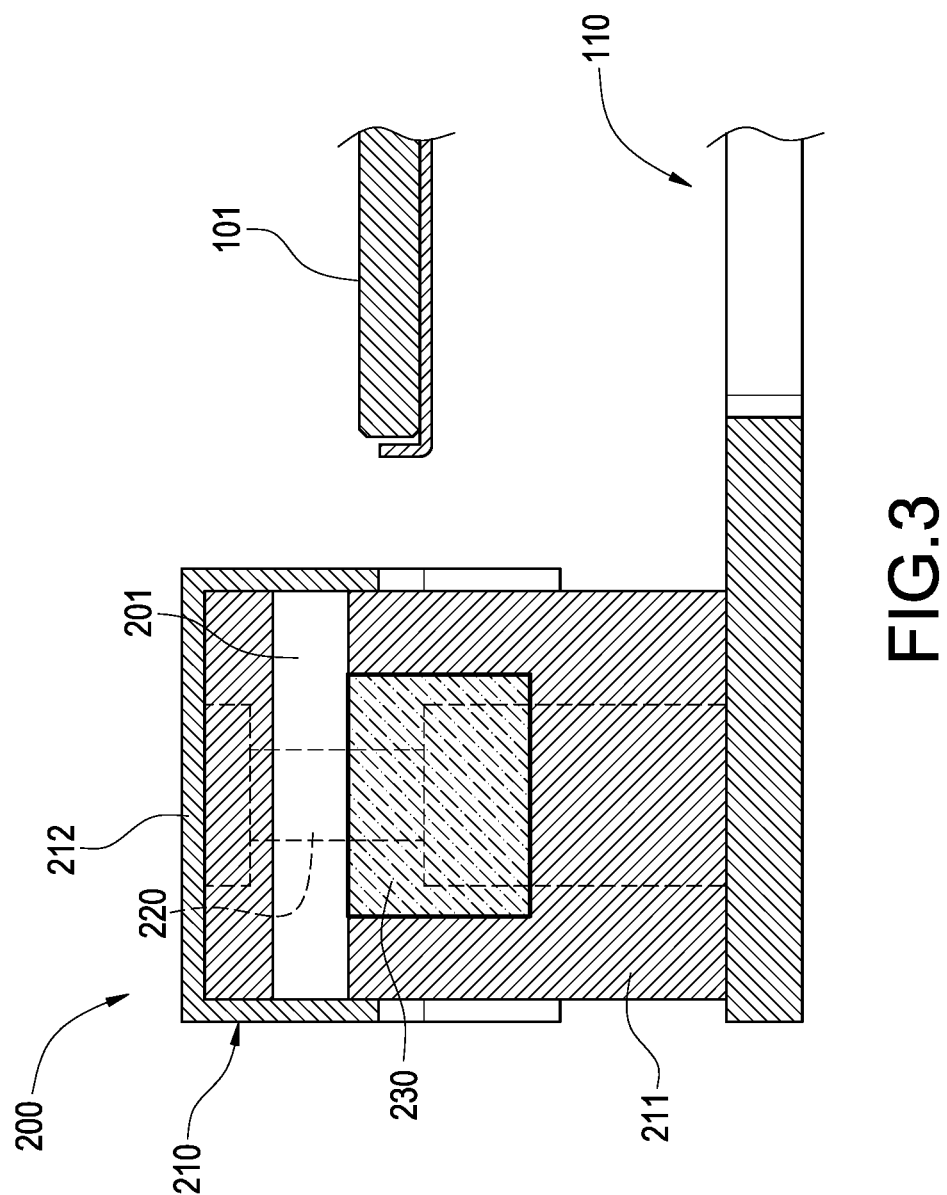
FIGS. 3-5 show the schematic views of the 3D printer in operation according to the first embodiments of the present invention.
Figure 4:
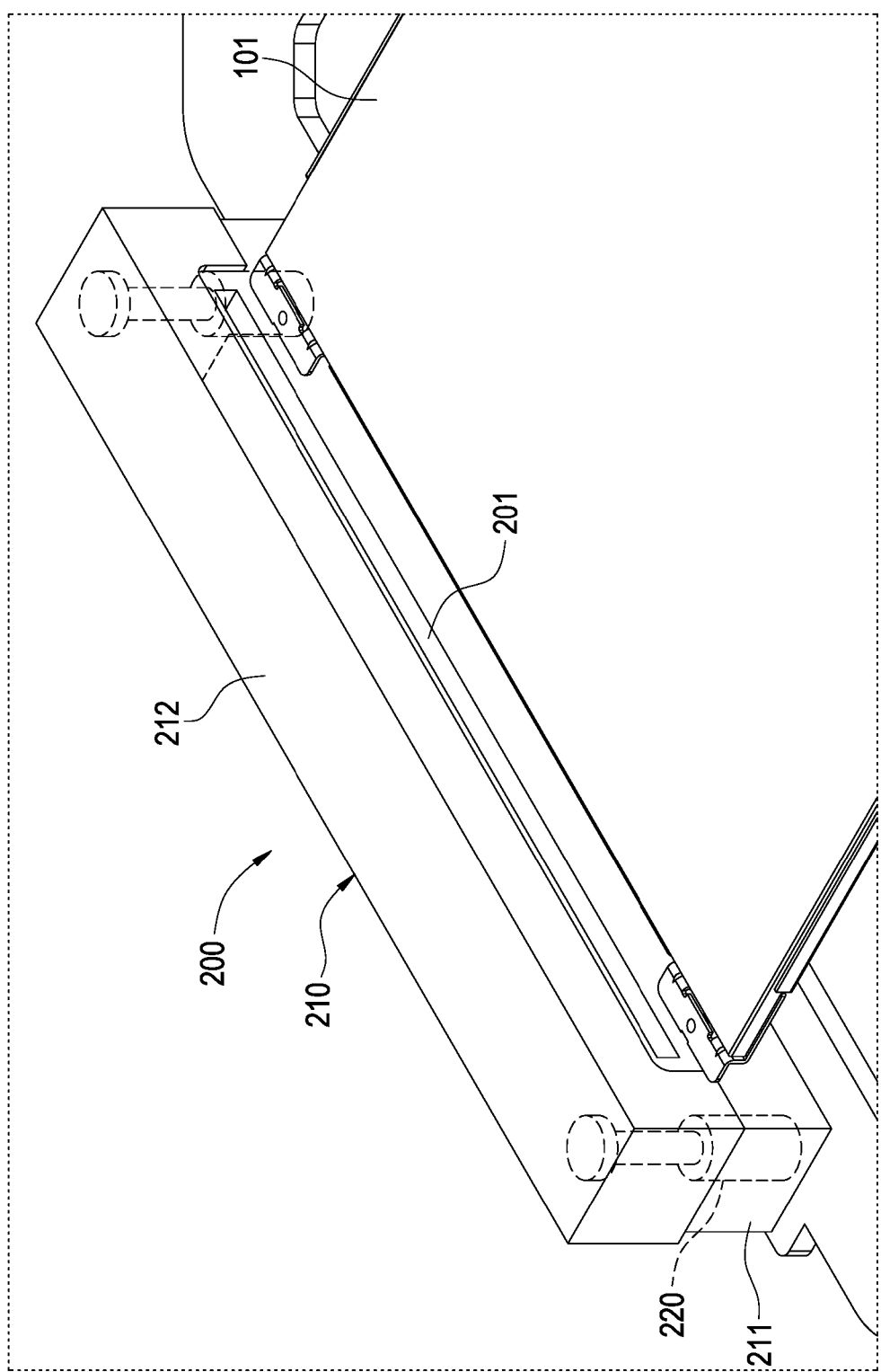
Figure 5:
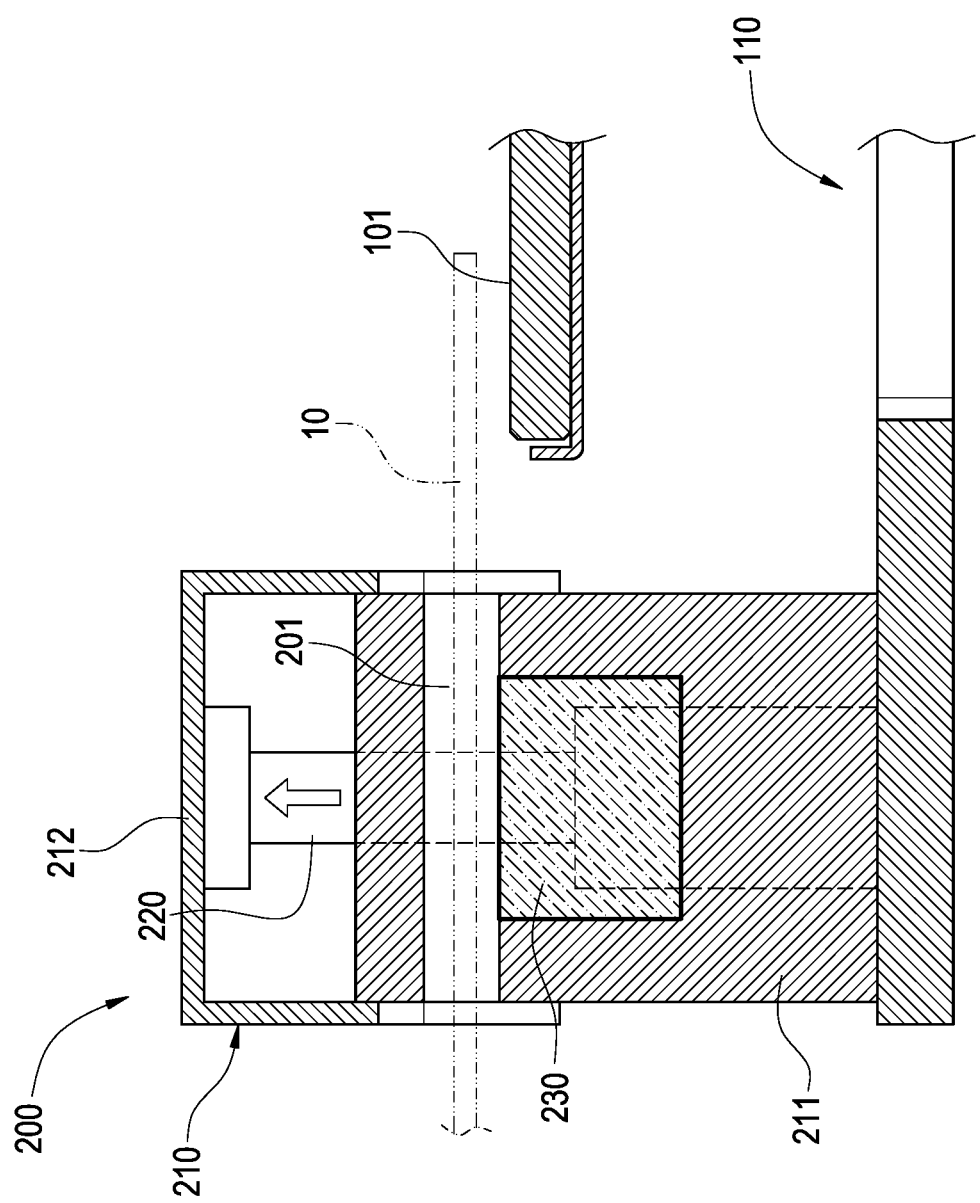

Please refer to FIGS. 1, 3, and 5. The user pushes a pictorial paper 10 manually into the feeding channel 201. Then, the flat scanner 230 scans the pictorial paper 10 passing through the feeding channel 201 and sends the scan image to the control module 300. The control module 300 controls the pen assembly 320 to color the surface of the model 20 according to the pictorial paper 10 during the printing of the model 20 such that that the pictorial paper 10 can be painted on the surface of the model 20.

Figure 6A:
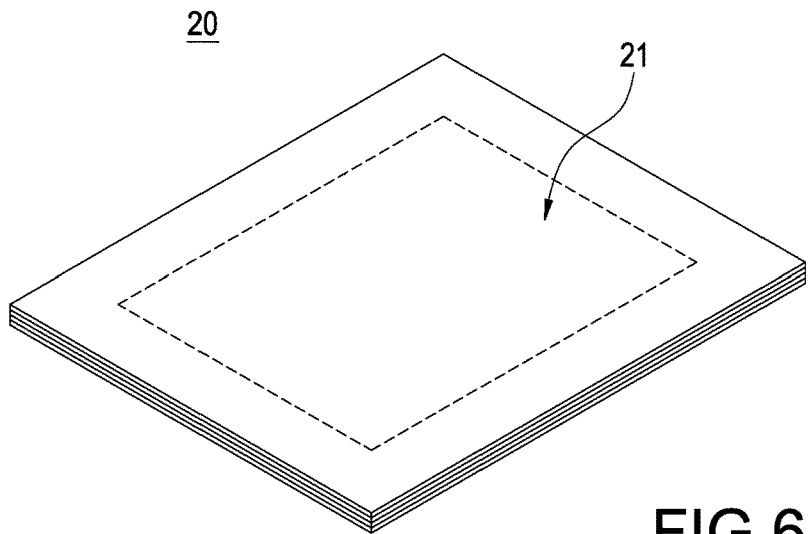
FIGS. 6A-6C show the schematic views of printing steps of the printed model of the 3D printer of the present invention.
Figure 6B:
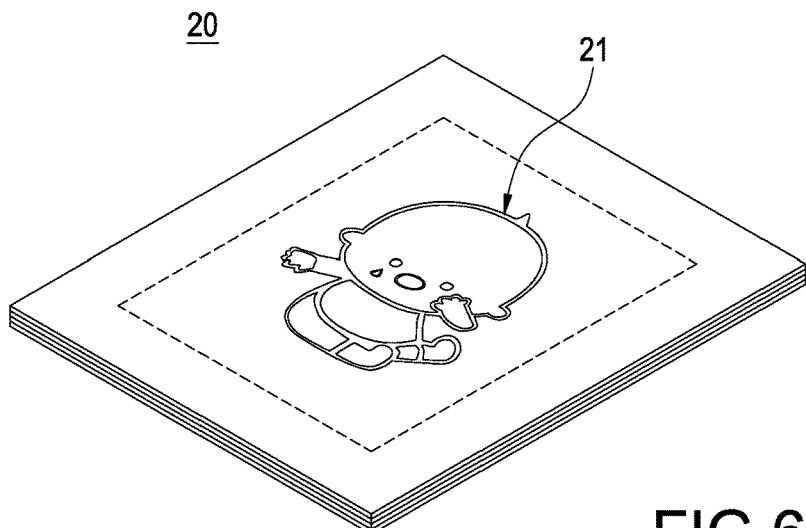
Figure 6C:
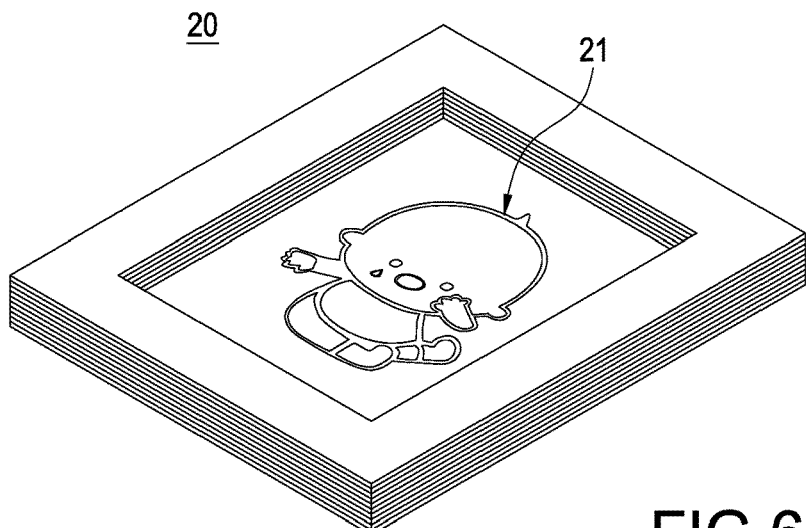

Please refer to FIGS. 1, 5, 6A, 6B, and 6C. When a picture is required to be painted on a surface area 21 of a recess of the model 20, a 3D data which defines the predetermined painting position corresponding to the surface area 21 is firstly loaded into the control module 300. The control module 300 receives the scan image of the pictorial paper 10 from the flat scanner 230 in which the pictorial paper 10 is predetermined to be painted on the surface area 21. Also, the control module 300 associates the 3D data with the scan image. The control module 300 can receive the scan image at any moment during the printing process. As show in FIG. 6A, the control module 300 controls the nozzle assembly 310 to print and stack the sliced layers in the surface area 21 according to the 3D data. Then, the printing process is paused and a semifinished model is formed with the surface area 21 exposed. As shown in FIG. 6B, the control module 300 controls the pen assembly 320 to paint the picture on the surface area 21 according to the scan image. As shown in FIG. 6C, after the picture has been painted, the control module 300 continues to control the nozzle assembly 310 to print and stack the sliced layers to form the protruding portion of the edge of the surface area 21 and the other portions of the model 20.

Figure 7:
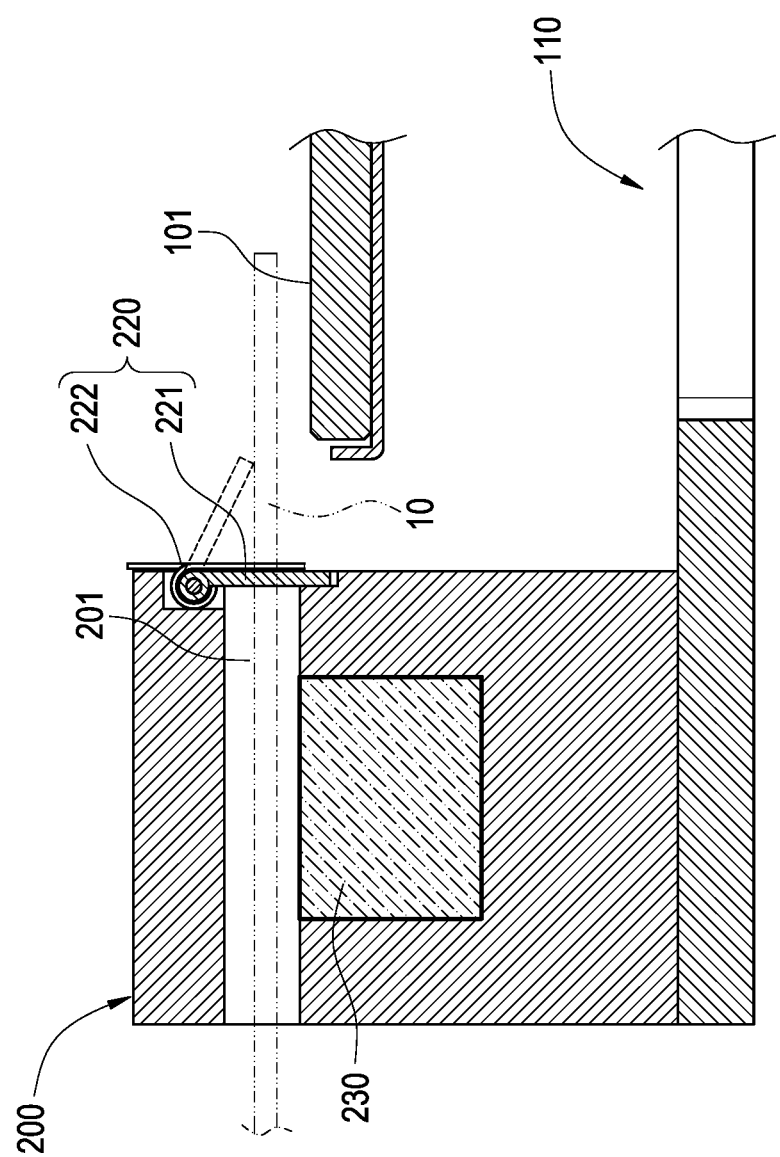
FIG. 7 shows the schematic view of the 3D printer according to the second embodiment of the present invention.

Please refer to FIG. 7. The structure of the 3D printer according to the second embodiment of the present invention is roughly similar to that according to the first embodiment in which the similar parts are not detailed again here. The difference between the first and the second embodiments is that in the second embodiment, the module body 210 is a mono-piece body and the feeding channel 201 is disposed in the module body 210. Also, the disposed location of the feeding channel 201 in the second embodiment is the same as that in the first embodiment and will not be described again. The closure mechanism 220 at least comprises a movable plate 221 pivoted to the module body 210. The upper edge of the movable plate 221 is pivoted to the module body 210 and thus the movable plate 221 can be driven by the gravitation to pivot downward to close the feeding channel 201. The closure mechanism 220 can further comprise a flexible restorer 222. In the current embodiment, the flexible restorer 222 is preferably a spring. Two ends of the spring are individually pressed against the module body 210 and the movable plate 221; therefore, the movable plate 221 can be pivoted to the module body 210 using the lower edge thereof such that the flexible restorer 222 moves the movable plate 221 to pivot upward to close the feeding channel 201. When the flat scanner 230 is not used, the feeding channel 201 can be closed to prevent the dust from adhering to the flat scanner 230 and from reducing the scan quality of the flat scanner 230. When the pictorial paper 10 passes through the feeding channel 201, the movable plate 221 can be pushed to open.

The 3D printer of the present invention can scan the flat image and paint it on the surface of the model 20 by means of the flat scanner 230 disposed corresponding to the printing plane 101.

Figure 8:
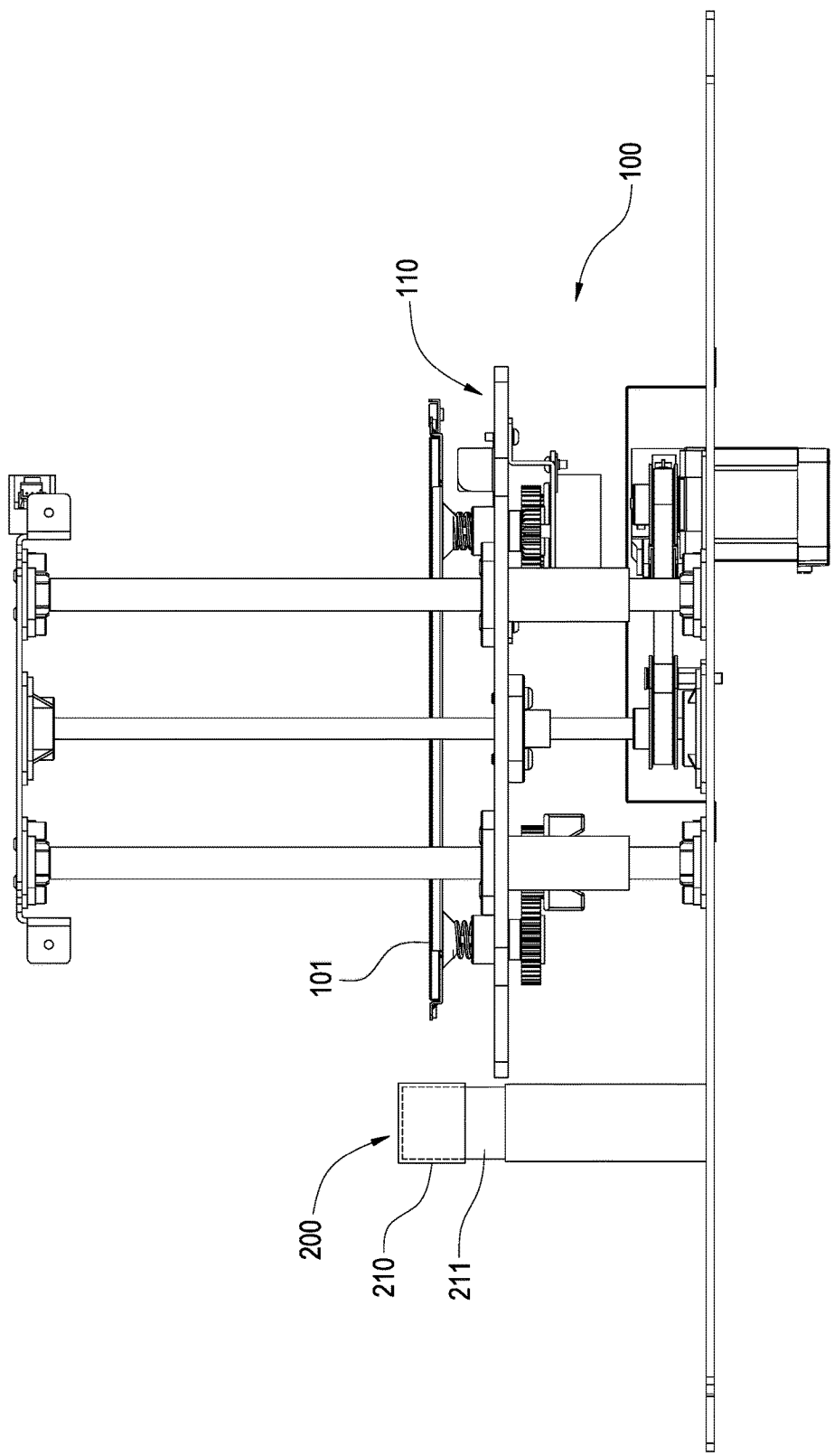
FIG. 8 shows the schematic view of the 3D printer of the present invention in another configuration.

The above-mentioned embodiments are preferably ones, but not limited to these. As shown in FIG. 8, the scanning module 200 also can be disposed on the device body 100 corresponding to the lifting platform 110, not disposed on the lifting platform 110. The lifting platform 110 can ascends and descends vertically to move the printing plane 101 to be flush with the scanning module 200, which facilitates the scanning process.

The embodiments disclosed in the above description are only preferred embodiments of the present invention, but not to limit the scope of the present invention. The scope of the present invention should be embraced by the accompanying claims and includes all the equivalent modifications and not be limited to the previous description.

What is claimed is:

1. A 3D printer having manual flat scanner, comprising:
   a device body (100) on which a printing plane (101) is defined; and
   a scanning module (200) arranged on the device body (100), wherein the scanning module (200) is electrically connected with a control module (300) which is electrically connected with a nozzle assembly (310) and a pen assembly (320), wherein a 3D data is loaded in the control module (300) and a predetermined painting position is defined in the 3D data, wherein the control module (300) receives a scan image from the scanning module (200) and controls the nozzle assembly (310) to print a model (20) according to the 3D data and meanwhile the control module (300) controls the pen assembly (320) to paint on the model (20) according to the predetermined painting position and the scan image during the printing of the model (20);

wherein the scanning module (200) comprises a module body (210), a closure mechanism (220), and a flat scanner (230), wherein the module body (210) has a feeding channel (201) disposed corresponding to a side edge of the printing plane (101), wherein the closure mechanism (220) closes the feeding channel (201) selectively, wherein the flat scanner (230) is disposed in the feeding channel (201) correspondingly;

wherein the module body (210) comprises a base (211) and a movable cover (212) stacked above the base (211), wherein the closure mechanism (220) is connected between the base (211) and the movable cover (212);

wherein the closure mechanism (220) is a rebound device.

2. The 3D printer having manual flat scanner according to claim 1, wherein the flat scanner (230) is disposed on the base (211).

3. The 3D printer having manual flat scanner according to claim 1, wherein the flat scanner (230) is disposed on the movable cover (212).

4. The 3D printer having manual flat scanner according to claim 1, wherein the closure mechanism (220) has a movable plate (221) pivoted to the module body (210).

5. The 3D printer having manual flat scanner according to claim 4, wherein the closure mechanism (220) has a flexible restorer (222) which is pressed against the module body (210) and the movable plate (221) to push the module body (210) to close the feeding channel (201).

6. The 3D printer having manual flat scanner according to claim 1, wherein the bottom of the feeding channel (201) is flush with the printing plane (101).

7. The 3D printer having manual flat scanner according to claim 1, wherein the bottom of the feeding channel (201) is higher than the printing plane (101).

8. The 3D printer having manual flat scanner according to claim 1, wherein the feeding channel (201) extends horizontally in parallel with the printing plane (101).

9. The 3D printer having manual flat scanner according to claim 1, wherein the flat scanner (230) scans a pictorial paper (10) passing through the feeding channel (201) to obtain the scan image, wherein the control module (300) controls the pen assembly (320) to paint the surface of the model (20) according to the scan image.

* * * * *